United States Patent [19]
Duffy

[11] 3,939,785
[45] Feb. 24, 1976

[54] SPRIG PLANTING APPARATUS

[76] Inventor: Willard W. Duffy, Rte. 1, Box 33, Okarche, Okla. 73762

[22] Filed: Mar. 18, 1974

[21] Appl. No.: 451,752

[52] U.S. Cl. .................................................. 111/3
[51] Int. Cl.² ........................................ A01C 11/00
[58] Field of Search .................... 111/14, 2, 3, 1, 8

[56] References Cited
UNITED STATES PATENTS

| | | | |
|---|---|---|---|
| 1,517,715 | 12/1924 | De Geus | 111/3 X |
| 2,715,882 | 8/1955 | Overstreet, Jr. | 111/3 |
| 2,889,959 | 6/1959 | Landgraf | 111/3 X |
| 3,187,698 | 6/1965 | Murray | 111/2 |
| 3,330,234 | 7/1967 | McAda | 111/2 |
| 3,515,079 | 6/1970 | Ware, Jr. | 111/3 |

Primary Examiner—Stephen C. Pellegrino

[57] ABSTRACT

A sprig planting apparatus adapted to press sprigs such as bermuda into the surface of the earth has a frame, wheels mounted on the rear of the frame, a sprig hopper mounted on top of the frame, and a conveyor adapted to convey sprigs placed into the hopper to an opening in the front of the frame. At the opening is mounted a sprig separating and distributing device which lifts the sprigs from the conveyor and separates the bermuda sprigs and drops them through the opening onto the ground. Directly behind the opening and having the same width as the opening is mounted a plurality of discs journaled in a shaft to each side of the frame. These discs roll over the bermuda sprigs forcing them into the ground to a prescribed depth.

16 Claims, 4 Drawing Figures

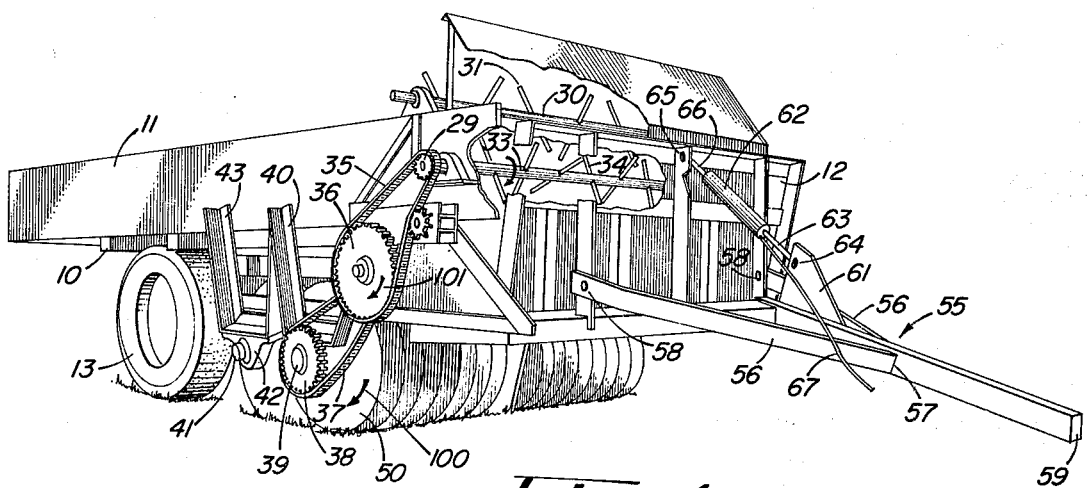

SPRIG PLANTING APPARATUS

BRIEF DESCRIPTION OF THE PRIOR ART

The best prior art relating to the device disclosed herein is a bermuda sprig planter which has a frame, rear wheels mounted to the frame, a hopper mounted on top of the frame with a conveyor for conveying the bermuda sprigs to an opening in the front of the frame. A distributing and separating apparatus is mounted over the opening for lifting the bermuda sprigs from the conveyor terminus, separating them and dropping them through the opening. A plurality of plows are mounted at the front of the frame and extend downwardly into the ground. The plurality of furrow-closing discs are mounted behind the opening. As the bermuda is dropped through the opening, it falls into the furrow cut by the plows. As the planter proceeds, the discs mounted to the rear of the opening close the furrow burying the bermuda sprigs.

BRIEF DESCRIPTION OF THE INVENTION AND ITS ADVANTAGES

The sprig planter above described had several operational disadvantages. First, the sprigs were conveyed to an opening which had a plurality of shoots in the opening so that the bermuda when it was broken up and distributed it fell into the opening and was directed by the shoots to the particular furrow made beneath the shoot. One problem with this type construction is that bermuda sprigs tend to hang up on the individual shoot edges. This often resulted in jamming of the machine so that the operator necessitated stopping the machine, cleaning out the shoots so that the sprigs would again fall onto the furrows underneath the plows. It was also difficult to place the plows close enough together so that sufficient numbers of rows of bermuda sprigs could be planted to adequately cover some areas. The machine described herein has a continuously free opening so that bermuda sprigs can fall without having any form of divider or shoot edge to catch upon. Furthermore, a plurality of discs spaced two inches apart provide complete coverage of the surface of the land so that the bermuda sprigs can be continuously pressed in over the entire width of the opening. In addition to the above, the discs are spaced one behind the other and in between each other so that they are selfcleaning; thus the machine can be used in ground which would under ordinary circumstances be unplantable.

BRIEF DESCRIPTION OF THE FIGURES

FIG. 1 is a perspective view of the sprig planting machine illustrating the plurality of rows of discs.

FIG. 2 is a side view of a spring planting machine illustrating the use of gauged wheels.

FIG. 3 is a side view of a spring planting machine illustrating the operation of the machine, and FIG. 4 is an end view of the disc planting assembly illustrated in the above figures.

DETAILED DESCRIPTION OF THE FIGURES

The same numbers will be used throughout the specification for similar elements.

Referring to all of the figures, but in particular to FIGS. 1 and 3, a frame 10 has mounted thereon a plurality of side walls 11, a front wall 12. A plurality of rear wheels 13 are journaled to frame 10 by bearings which are not illustrated. Contained between side walls 11 is a spring storage bin which has mounted therein a conveyor 14 which is of the usual type comprising a pair of chains 15, having a plurality of cross members 16 attached between chains 15. A sprocket 9 is journaled in side walls 15 and provides a means for holding the chains 15 in position. A metal bed 17 lies directly beneath the upper portion of chains 15 and cross members 16. The metal bed is adapted to hold a plurality of sprigs 18, such as bermuda grass sprigs, for example. The forward end of conveyor 14 is attached to a sprocket 19 which in turn is journaled about a shaft 20. Shaft 20 is ridgedly attached to a chain sprocket 21 and to a gear 22. Sprocket 21 is coupled to a second sprocket 23 through a chain 24. Sprocket 24 is likewise attached to a shaft 25 and to a ratchet 26. A first distributor shaft 30 has a plurality of radial arms 31 attached thereto. A gear 32 is attached to distributor shaft 30 and meshed with gear 22. A second distributor shaft 33 likewise has a plurality of radial arms 34. Distributor shaft 33 is coupled through a gear 34 (see FIG. 1) and chain 35 to a second gear 36. A second chain drive coupled to gear 36 (not shown) is coupled to a chain 37 to a sprocket 38 which is attached to a disc shaft 39. Disc shaft 39 is journaled to bearings which are mounted on U-frame 40. A second disc shaft 41 is likewise mounted through bearings 42 to a second U-frame 43. Similar U-frames are mounted on both side of the frame and similarly spaced. The spacing between shafts 39 and 41 is determined by the diameter of disc 50. The preferred spacing is slightly greater than the radius of disc 50. The intermeshing of the discs furthermore provides selfcleaning of the discs; therefore, the assembly can be used in ground which is too tacky for other planting apparatuses.

Depth Control

Depth control for the embodiment illustrated in FIGS. 1 through FIG. 3 is provided as follows: Referring to FIG. 1, a drawbar assembly 55 has members 56 attached thereto at 57 and to the planting apparatus through pivots 58. Drawbar end 59 is attached to a tractor or other hauling device 60 (see FIG. 2). In order to adjust the depth of the device shown in FIG. 1, a vertical member 61 is attached through a hydraulic piston 62 through the piston rod 63 and piston housing extension 64 through pivotal mounts 65 and 66, respectively. Hydraulic tubes 67 are connected to the tractor. Referring to FIG. 2, a method of depth control is illustrated having gauged wheels 68 mounted to the front of the planting apparatus through bearings not illustrated. The plane defined by the front wheels 68 and the rear wheels 13 define the total depth that the disc 50 will be permitted to penetrate the ground. A hydraulic cylinder 62 can also be used to lift gauged wheels 68 and disc 50 out of the ground and away from the ground so that the entire unit can be hauled without disc 50 touchcing or damaging the ground or road surface.

Operation of the Disc Planting Apparatus

Power Drive for Planter

The planter is provided with a means of operating the conveyors and distributors in the following manner: Disc 50 (see FIG. 3) rotates drive shaft 39 which in turn is coupled through a sprocket 80 to a chain 81, and to a second sprocket 82 which is likewise coupled to shafts 41. The conveyor is operated by a Pittman arm assembly which essentially comprises an eccentric drive 83 mounted to sprocket 82 and an arm 84 which is coupled to ratchet 26. Rotation of ratchet 26 is then operated by movement of arm 84.

Operation of the Sprig Planter

Referring to the drawings, drawbars 55 and 59 are connected to a tractor 50 or other device, and hydraulic cylinder 62 is pressured up to lift disc 50 clear of the ground. Tractor 50 may then move using rear wheels 13 as a method of supporting the planter during movement of the planter from location to location or during the actual planting operation. When planting is to begin, the storage bin formed by the sides 11 is filled with bermuda sprigs 18 or other sprigs or material to be planted into the ground. Hydraulic cylinder 62 is repositioned so that disc 50 settle into the ground a desired depth. The desired depth is normally reached by letting hydraulic fluid out of the cylinder, thereby shortening the distance between pivots 64 and 65. Once the discs have settled onto or into the ground, tractor 60 begins pulling, through drawbar 55, the planting apparatus in a forward direction. As the planter moves in a forward direction, disc 50 will turn in the direction of arrow 100. Movement of disc 50 will turn in the direction of arrow 100. Movement of disc 50 in the direction of arrow 100 will cause shaft 39 and shaft 41 to rotate in the same direction. Chain 37 will turn, causing sprocket 36 to likewise turn in the direction of arrow 101. Chain 35 will rotate, causing sprocket 29 and distributor shaft 33 to rotate in the same direction.

Referring to FIG. 3, rotation of the wheels in the direction of arrow 100 will cause a movement of eccentric 83 and rod 84 to ratchet 26. Ratchet 26, as previously explained, is coupled through chain drive 24 to shaft 20, which causes the chain conveyor 14 to move in a direction toward the opening, generally referred to by No. 103. Bermuda sprigs or other types of material 18 will then be conveyed toward opening 103, be torn apart, or separated, and distributed by distributor radial projections 34 and by distributor radial projection 31, each of which tends to as previously mentioned to break up the sprigs or other material and distribute it throughout the opening 103. The material being thus distributed will fall in the direction of arrow 104 to the ground 105. Once on the ground, the rolls 50 will crush the bermuda sprigs 18 into the ground, as illustrated in FIG. 4.

A predetermined amount of material can be planted as follows: Eccentric gear 83 through an adjustment 106 can control the amount of eccentricity and thus movement of rod 84. The amount of eccentricity set by eccentric 83 will cause rod 84 to move ratchet 26 to engage either 1, 2, 3, 4, or 5 notches on ratchet gear 26. The setting will then give 5 different settings of bushels to the acre. For example, from 20 to 100 bushels to the acre can be dropped on the ground in accordance with the previously described setting adjustments. In the preferred embodiment, the ratchet assembly 26 has a 16-toothed sprocket 23 welded to the inside making it a transmission device to reduce the speed of the conveyor drag chain. Drag chains 15 moves material 18 forward to the opening. A 60-tooth sprocket 21 is mounted on the front conveyer drive shaft 20 which is, of course, driven by the 16-tooth sprocket through chain 24. Distributor shaft 30 is driven by a 54-tooth gear 22 in the direction of arrow 110 which meshes with 30-tooth gear 32. Distributor shaft 30 in this way insures even feeding to the main distributor or planting cylinder 33. Because of the gear ratios, main distributor 30 drives at a rate 50 percent faster than the linear speed of the conveyor, thereby preventing overload of grass or sprigs from the conveyor to the outlet 103. The distributor shaft or cylinder 33 is driven by the movement of the disc 50, causing rotation of shaft 39, and thus rotation of sprocket 38. When sprocket 38 turns, chain 37 moves, causing sprocket 36 to rotate in the direction of arrow 101. This movement causes chain 35 to turn, causing rotation of sprocket 29 which is coupled to shaft 33.

When no gauge wheels as shown in FIG. 2 are utilized, the disc 50 vary from 20 inches in diameter to 29 inches in diameter. The disc will also vary in thickness from ½ inch to ⅝ inch for loose soils and are 3/16 inch for hard ground. When gauge wheels are used, as illustrated in FIG. 2, the depths that disc 50 penetrate are determined by the placement of gauge wheels 68. These wheels may be fixed or they may be made adjustable.

It is also understood that the driving system may be incorporated either through the disc, as is illustrated, or through the gauge wheels 68 or gear wheels 13. Since there is not an excessive amount of weight on gear wheels 13, it is more difficult to drive the necessary conveyors and distributor cylinders under these conditions. When gauge wheels are used, smaller disc may also be used, since the drive can be coupled through the front gauge wheels 68 rather than through disc 50. When smaller discs are used, they may usually vary in the preferred embodiment from 12 inches to 18 inches in diameter.

Conclusions

A unique sprig planting machine has been disclosed. In the preferred embodiment, the disc 50 have been illustrated as being welded to shaft 39. It is also obvious that where the power is not obtained through driving of the discs that the discs may be journaled on shaft 39 rather than welded to shaft 39; thus, the discs may be free to rotate about shaft 39. Several methods have also been illustrated to determine the exact depths that the machine will plant sprigs. It is obvious, of course, that other methods of setting the depth can be used and are still well within teachings of this invention. Other changes and modifications can be made in the particular embodiment disclosed and still be well within the scope of the invention as described in the specification and the appended claims.

What I claim is:

1. In a device for planting sprigs into the surface of the earth said device having a frame having a forward and a rear end, a sprig storage bin mounted on top of said frame, a sprig outlet, a conveyer means for moving material in said sprig storage bin to and through said outlet and onto the surface of said ground, and means at said outlet for separating and distributing said sprigs along said outlet, an improved device comprising:
   a. a shaft means mounted under said frame behind said outlet;
   b. a plurality of disc sprig planting means axially mounted to and spaced along said shaft means by a distance substantially equal to the width of said outlet to roll said sprigs into said ground;
   c. wheel support means mounted behind said shaft and journaled to the rear end of said frame;
   d. draw bar means attached to the forward end of said frame; and e. means on said device for controlling penetration of said disc sprig planting means into said surface of the earth.

2. A device as described in claim 1 wherein said shaft means comprises a first and second shaft, parallelly spaced and journaled to said frame and wherein said disc means comprises a plurality of discs mounted to said first and second shafts, and wherein said discs are spaced on said first and second shafts to intermesh with one another.

3. A device as claimed in claim 2 wherein said disc means are rigidly attached to said shaft means.

4. A device as described in claim 2 wherein said disc means is rotatably attached to said shaft means.

5. A device as described in claim 3 wherein each of said discs on said first and second shafts is spaced approximately 4 inches apart.

6. A device as described in claim 4 wherein each of said discs on said first and second shafts is spaced approximately 4 inches apart.

7. A device as described in claim 1 wherein said means for controlling the penetration of said disc means into the surface of the earth comprises a tractor, means for attaching said tractor to said draw bar means, and a hydraulic piston mounted between draw bar means and said frame wherein said draw bar means is pivotally attached to said frame.

8. A device as described in claim 1 wherein said means for controlling the penetration of said disc means into the surface of the earth comprises gage wheel means journaled to the forward end of said frame and in front of said disc means whereby the plane defined by said wheel means and said gage wheel means and the mounting location of said shaft means will determine the penetration of said disc means into the surface of said earth.

9. A device for planting sprigs in the surface of the earth comprising:
 a. a frame having sides, front and back;
 b. wheel means journaled under the back portion of said frame means;
 c. sprig storage means mounted on top of said frame;
 d. outlet means formed through said frame and at the front of said frame;
 e. conveyor means for moving said sprigs from said storage means to said outlet;
 f. distributor means mounted across said outlet and to said storage means for separating and distributing said sprigs;
 g. shaft means journaled to each side of and under said frame;
 h. disc means axially attached to said shaft means and spaced along said shaft means by a distance substantially equal to the width of said opening; and
 i. means on said device for controlling the penetration of said disc means into the surface of the earth.

10. A device as described in claim 9 wherein said shaft means includes first and second shafts, and wherein said disc means is secured to said first and second shafts parallelly spaced by a distance slightly greater than the radius of said discs and wherein said discs are spaced on said first shaft with respect to said second shaft to intermesh.

11. A device as described in claim 10 wherein said discs are spaced at least four inches apart on each shaft.

12. A device as described in claim 11 wherein said discs vary in diameter from 18 inches to 29 inches.

13. A device as described in claim 10 wherein said means for controlling the penetration of said discs into said earth comprises a draw bar pivotally attached to the front of said frame and a hydraulic cylinder means attached from said frame to a point intermediate said pivot attachment and the end of said draw bar.

14. A device as described in claim 13 wherein said discs have a diameter from 18 inches to 29 inches.

15. A device as described in claim 10 wherein said means for controlling the penetration of said discs into said earth comprises a pair of gage wheels journaled to the front of said frame.

16. A device as described in claim 15 wherein said discs have a diameter from 12 inches to 18 inches.

* * * * *